(12) United States Patent
Ghanwani et al.

(10) Patent No.: US 6,185,187 B1
(45) Date of Patent: Feb. 6, 2001

(54) METHOD AND APPARATUS FOR RELATIVE RATE MARKING SWITCHES

(75) Inventors: Anoop Ghanwani, Durham; Gerald Arnold Marin, Chapel Hill; Ken Van Vu, Cary, all of NC (US)

(73) Assignee: International Business Machines Corporation, Armonk, NY (US)

( * ) Notice: Under 35 U.S.C. 154(b), the term of this patent shall be extended for 0 days.

(21) Appl. No.: 08/988,014

(22) Filed: Dec. 10, 1997

(51) Int. Cl.$^7$ ................................ H04J 3/14; H04L 12/56
(52) U.S. Cl. ..................... 370/232; 370/231; 370/235; 370/253
(58) Field of Search ................................ 370/235, 236, 370/229, 230, 231, 232, 233, 234, 252, 253

(56) References Cited

U.S. PATENT DOCUMENTS

| | | | |
|---|---|---|---|
| 5,457,687 | * 10/1995 | Newman | 370/232 |
| 5,633,859 | * 5/1997 | Jain et al. | 370/234 |
| 5,959,973 | * 9/1999 | Meurisse et al. | 370/232 |

* cited by examiner

Primary Examiner—Hassan Kizou
Assistant Examiner—Mitchell Slavitt
(74) Attorney, Agent, or Firm—Gerald R. Woods; Robert V. Wilder

(57) ABSTRACT

A data transfer flow control system includes a plurality of nodes or switches in a network, which are interconnected by transmission links. Resource management cells are transmitted along with data cells in information transfer sessions. As the amount of session traffic at any node increases, the level of occupancy of the buffers for that node correspondingly increases to temporarily store overflow data. At every network node, a "fair share" cell rate is determined for each output transmission link. Whenever the current cell rate (CCR) of any session exceeds the fair share cell rate for the output link at a node, the buffer occupancy threshold values for setting congestion indication fields in the resource management cells are adjusted downwardly such that a lower threshold buffer occupancy will effect a traffic congestion setting for that session.

12 Claims, 2 Drawing Sheets

METHOD AND APPARATUS FOR RELATIVE RATE MARKING SWITCHES

RELATED APPLICATIONS

The present application is based upon a provisional application filed Dec. 11, 1996 by the assignee hereof, which is included herein by reference. patent application entitled "ATM NETWORK AVAILABLE BIT RATE (ABR) FLOW CONTROL SYSTEM", Attorney Docket RA9-96-049, filed on, assigned to the assignee of the present application and included herein by reference.

FIELD OF THE INVENTION

The present invention relates generally to data communications networks and more particularly to a flow control system for regulating the flow of information within a network.

BACKGROUND OF THE INVENTION

Asynchronous Transfer Mode (ATM) networks are expected to provide support for heterogeneous traffic classes having diverse quality of service (QoS) requirements. To that end, four classes of traffic have been defined based on the QoS desired by a session. The four classes, in decreasing order of priority are set forth below.

A Constant Bit Rate (CBR) traffic class has stringent requirements for both loss and delay. Typically, a peak rate reservation is made along the path for a given session. Applications that might use this class of service are voice and uncompressed video. A Variable Bit Rate (VBR) traffic class has slightly less stringent delay requirements. The traffic is usually "bursty", and therefore, to improve utilization, a reservation is made which is somewhat less than the peak rate of the session. VBR traffic may be further sub-divided into real-time variable bit rate (rt-VBR) and non-real-time variable bit rate (nrt-VBR) depending on the nature of the delay guarantees required. Compressed video and multimedia email are examples of applications that may use the rt-VBR and nrt-VBR classes, respectively. An Available Bit Rate (ABR) traffic class is a "best effort" service class for applications such as file transfer and email. An amount of bandwidth termed "minimum cell rate" (MCR) is reserved for each session. Each session then gets an additional amount of bandwidth depending on availability. A session is guaranteed a very low loss provided its traffic conforms to its ACR. There are, however, no delay guarantees. An elaborate flow control mechanism is used to maximize network utilization, minimize loss and ensure that sessions share the bandwidth in a fair manner. An "unspecified bit rate" (UBR) is also a "best effort" service class. Unlike ABR, there is no flow control and there are no guarantees for loss or delay. Of the four classes of ATM network traffic control presented above, the present disclosure is focused upon the rate based flow control methodologies used for the ABR traffic class.

Efficient informational flow control has been an important consideration in the research and design of high speed communications networks. The ATM Forum has recently standardized rate-based flow control for best effort traffic in asynchronous transfer mode (ATM) networks. Flow control processing varies a sender's allowable rate of information transfer in response to feedback from the network. The simplest switches provide only binary feedback; i.e. "congested" or "not congested". The ATM forum has standardized two methodologies, namely explicit forward congestion information (EFCI) and relative rate (RR) marking. In a network with EFCI switches, if the feedback received indicates that the network is not congested, the session's source increases its allowable cell rate (ACR); otherwise the ACR is reduced. In a network with RR marking switches, an additional form of feedback is possible where the source simply maintains its ACR.

Typically the sending rate of a session during which information is being transferred will oscillate around a desired operating point. Using such a scheme, a session traveling many "hops" (node-to-node transfers) will be asked to reduce its ACR if any one of the nodes along its path is congested. It is therefore at a disadvantage with respect to sessions traversing a single hop (or fewer hops). Serious fairness problems result, where long haul sessions are "starved". This well known problem is commonly referred to as "beat down". One solution to the beat down problem is to use "explicit rate" (ER) methodologies where switches are more intelligent, and can compute an estimate of the allowable rate for each session. These switches are considerably more complex to implement, even more so when targeted for high speed operation. An alternative solution to this problem is for switches to use intelligent marking where the switch selectively indicates congestion to only those sessions having a high level of activity.

In the past, practitioners have suggested the use of increase and decrease algorithms, such as an additive increase and a multiplicative decrease, for congestion avoidance. However, most of these proposals suffer from the above noted "beat down" problem. As a result, simple increase and decrease algorithms such as EFCI and RR marking result in an unfair allocation of bandwidth since the sessions traversing more hops get "beaten down".

Others have proposed the use of selective binary feedback as a solution to the beat down problem. In such schemes, routers perform measurements and calculations to compute a "max-min" fair share for each session passing through it. The router will then set the congestion indicator for only those sessions using more than the computed fair share. However, some proposed schemes are targeted for router-based connectionless networks and do not specifically address ATM networks. Moreover, prior art schemes require the maintaining of per-session information and to perform an iterative calculation to estimate the fair share for each session. Also, such schemes require that the bandwidth demand for each session be estimated by measuring the resources consumed by the session at the router. This technique is relatively complicated and is also difficult to implement.

In another prior art scheme, an intelligent switch maintains a value representative of the mean allowable rate for a session. If the switch is congested, the congestion indicator (CI) bit is set in the resource management (RM) cells of those sessions whose ACR is bigger than this value. That technique requires constant modification of the mean allowable cell rate using the CCR value in the RM cell and some other parameters for manipulating the rate when the switch is congested. This technique is also quite complicated and difficult to implement.

In still another proposed solution, a lower priority is given to sessions entering the network at a given switch, and higher priority is given to sessions that are "transiting" through that switch. However, that technique may not be compliant with standardized procedures that require that all conforming traffic be treated with the same priority at a switch. Further, the above technique relates more to throughput than it does to "fairness". The scheme assumes a wide area network (WAN) environment where the network is overloaded so that losses occur. In a local area network (LAN) scenario running ABR, that assumption is not necessarily true.

Thus there is a need for an intelligent marking scheme for RR marking switches which is easy to implement and which provides a more effective control methodology for information flow within networks.

SUMMARY OF THE INVENTION

A data transfer flow control system for a communications network includes a plurality of nodes interconnected by transmission links. Buffers located at the switches are arranged to store information segments or data cells of data transfer sessions. Resource management cells are also transmitted along with data cells in the information transfer sessions. The resource management cells have fields which contain information useful in managing information transfer rates along the network. As the amount of session traffic at any node increases, the level of occupancy of the buffers for that node correspondingly increases. At every network node, a "fair share" cell rate is determined for each output transmission link using the cell rate capacity of the link and the number of sessions traversing that link.

Whenever the current cell rate (CCR) of any session exceeds the fair share cell rate for the output link at a node, the buffer occupancy threshold values for setting congestion indication fields in the resource management cells are adjusted downwardly such that a lower threshold buffer occupancy will effect a traffic congestion setting for that session.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

In order to perform flow control, an ABR session periodically sends out control cells called Resource Management (RM) cells. Switches along the path may indicate congestion by modifying fields in the RM cell. The destination is responsible for turning around the RM cells and sending them back to the source which then adjusts its ACR based on the feedback received. Some of the fields in the RM cell include the "current cell rate" (CCR), the "congestion indicator" (CI), the "no increase" (NI) indicator and the "explicit rate" (ER) field. The CCR field is filled by the source with the ACR and is not modified by any of the network elements along the path or by the destination. The CI field is a single bit field used as a congestion indicator. In RR marking switches, a congested switch will set this bit in the RM cell. In the case of EFCI switches, the switch sets the EFCI bit in the header of data cells. The destination is responsible for saving the congestion status and appropriately setting the CI bit in the RM cell before sending it back to the source. A source which receives an RM cell with the CI bit set, will reduce its ACR by a predetermined fraction of what it currently holds. The field is important for EFCI and RR marking switches only. The NI single bit field is used as a no increase indicator. A source which receives an RM cell with the NI bit set will simply maintain its current value of ACR. The ER field is used by explicit rate switches, which fill this field with the computed estimate of the ACR for the session.

The NI/CI fields are interesting to the source if any of the switches along its path are either EFCI or RR marking switches. If neither of these bits are set, the source increases its rate by a predetermined fixed quantity. Based on the feedback received from the returning RM cells, the source maintains a value of the ACR for the session. If the session is to be considered as "conforming", its sending rate must never exceed its ACR. The ACR is computed by the source in the case of EFCI and RR marking switches. For ER switches, the ACR is simply set to the value contained in the ER field of the returning RM cells.

Explicit forward congestion indication (EFCI) is the most basic form of ABR flow control. In EFCI, the switches need not be modified at all. Only the source and destination need modification. The switch does not even recognize RM cells. If the switch is congested, it sets a combination of bits in the header of the data cells to indicate congestion. The destination must save this congestion information. When the next RM cell arrives at the destination, the destination will set the CI bit in the RM cell if the header of the data cells indicated a congested network. With the receipt of every RM cell, the source will increase its rate if the CI bit is not set, and will otherwise reduce its rate.

Figure 1:
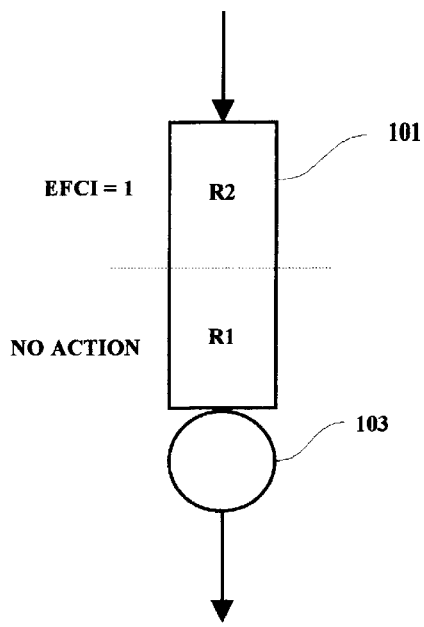
FIG. 1 is an illustration of the basic operation of an EFCI switch.

FIG. 1 shows the basic operation of an EFCI switch. If the buffer 101 occupancy at the switch 103 falls in region R1, no action is taken. The CI field in the RM cells will not be modified by the destination, and the source will be allowed to increase its ACR. On the other hand, if the buffer 101 occupancy is in region R2, the switch 103 assumes that it is congested and the switch will set the EFCI bits in the header of all data cells. One possible arrangement of exemplary pseudocode for marking in EFCI switches is as follows:

```
if (buffer occupancy is in region R2) {
    Data.EFCI = 1; /* set the EFCI bit in the data cells */
}
```

The destination saves this congestion information and sets the CI bit in the RM cell. When the source receives the RM cell, it will reduce its ACR.

To support relative rate (RR) marking, a switch must be able to recognize RM cells. The switch then has the option of setting the NI bit, the CI bit or neither. If the switch can handle more traffic, it will not set any of the bits and the source will increase its rate. If the switch is operating at a desired utilization, possibly deduced, for example, from the queue length, it will set NI. When a source receives an RM cell with the NI bit set, but with CI equal to zero, it will simply maintain its current value of ACR. If the switch is congested, it will set the CI bit and the source will reduce its ACR when it receives the RM cell.

Figure 2:
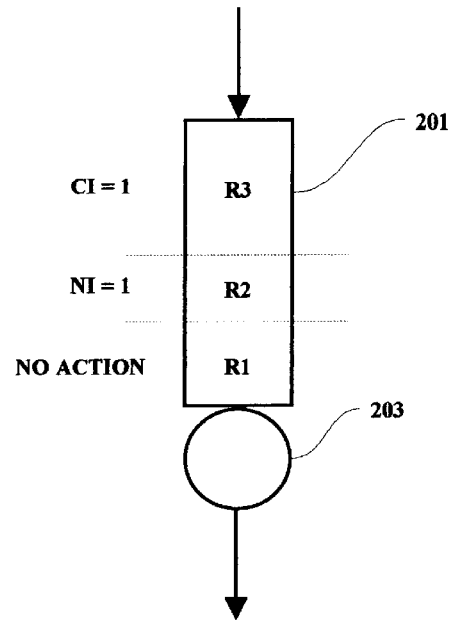
FIG. 2 is an illustration of the basic operation of an RR marking switch.

FIG. 2 shows the basic operation of an RR marking switch. If the buffer 201 occupancy at the switch 203 falls in region R1, neither of the NI or CI bits is set, and the source will be allowed to increase its ACR. If the buffer 201 occupancy is in region R2, the switch assumes that it is operating at a desired utilization and the NI bit is set. If the buffer 201 occupancy is somewhere in region R3, the switch assumes that it is congested and it sets the CI bit in the RM cells. An exemplary pseudocode for the marking is as follows:

if (buffer occupancy is in region R2) { RM.NI=1; /* set the NI bit in the RM cell */ }
if (buffer occupancy is in region R3) { RM.CI=1; /* set the CI bit in the RM cell */ }

The previous methodologies impose minimal requirements on the switch with the end stations taking appropriate action to act on feedback from the network. Explicit rate (ER) methodologies assign the computation effort to the switches. Each switch along the path of a session computes an estimate of the allowable rate for the session. The minimum of the explicit rate indicated by all switches along the path is returned to the source in the RM cell. The source simply sets its allowable rate to the value indicated in the RM cell. ER switches are significantly more complex to implement because of the computations that must be performed and the per-session state information that must be maintained by the switch. Further, for the scheme to be effective, the switch must be able to make accurate utilization measurements in order to estimate the capacity available for ABR traffic. All of these requirements make it difficult to build a competitively priced ER switch for operation in high speed networks.

The notion of fairness is very difficult to quantify and may be defined in a number of ways. One of the simplest definitions is that which allows any session in the network to use as much resources as any other session; i.e. all sessions must have equal access to the network's resources. In the example illustrated in FIG. 3, the "bottleneck" link for sessions 1, 2 and 3 is the first link (between switches 301 and 303). Therefore each of the sessions is expected to get a capacity of ⅓ units. The second link (between switches 303 and 305) is shared by sessions 1 and 4. Of these, the rate for session 1 has been limited to ⅓ units by the first link. Thus, there is capacity for ⅔ units available which session 4 should ideally be allowed to use. Despite this, a capacity of 1 unit will remain unused on link 3 (between switches 305 and 307) because all the sessions have other bottleneck links which restricts the capacity that they are able to use.

Figure 3:
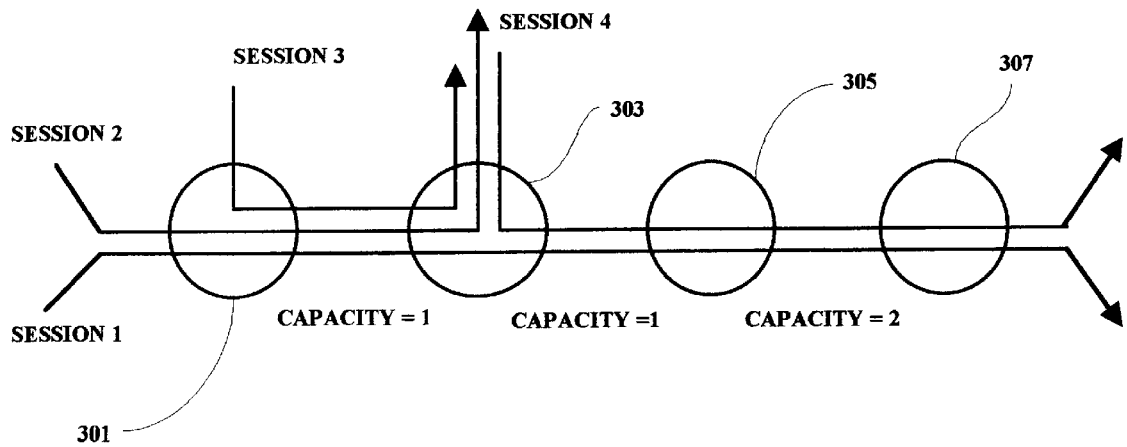
FIG. 3 shows an example of a typical network operation in handling four sessions.

The FIG. 3 example illustrates the notion of max-min fairness where the aim is to maximize the minimum capacity allocated to any session so as to improve the network utilization. This is achieved in the following manner. First, decide which sessions must be limited to low allocation because of bottleneck links along their path. After those sessions have been provided the best possible allocation, the focus shifts to maximizing the allocation of the remaining sessions which is again done in a similar manner. The procedure continues until all sessions have their best possible allocations. It is easy to see that every session must have a bottleneck link when capacities are allocated in this fashion.

The reason the "beat down" problem occurs is that a session may be prevented from increasing its rate if any one of the switches along its path is even slightly congested. Therefore sessions traversing fewer hops have an unfair advantage over sessions traversing more hops. This unfairness, however, may be overcome when it is recognized that the rate for any session must be controlled by only one switch, i.e. the switch at the bottleneck link for that session. As hereinbefore noted, in max-min fairness, every session must have a bottleneck link. The next concern is finding the bottleneck for a given session. To do this, it is assumed that the switch has the ability to estimate the quantity C(ABR) which denotes the availability capacity for all ABR sessions using the given link. In the absence of actual measurements, the switch may compute $C(ABR)=\eta C-(Reserved)$, where C is the link capacity, $\eta <=1$ is the target link utilization, and C(Reserved) is the capacity reserved for CBR and VBR sessions. The number of ABR sessions k using the link is also needed. C(Reserved) and k should be easily obtainable because all sessions, both reserved and unreserved, must go through the call set-up phase. The fair share for each session is then roughly estimated as $C(Fair)=C(ABR)/k$. The NI and CI bits will be set when the switch is congested only for those sessions whose CCR is bigger than C(Fair).

Figure 4:
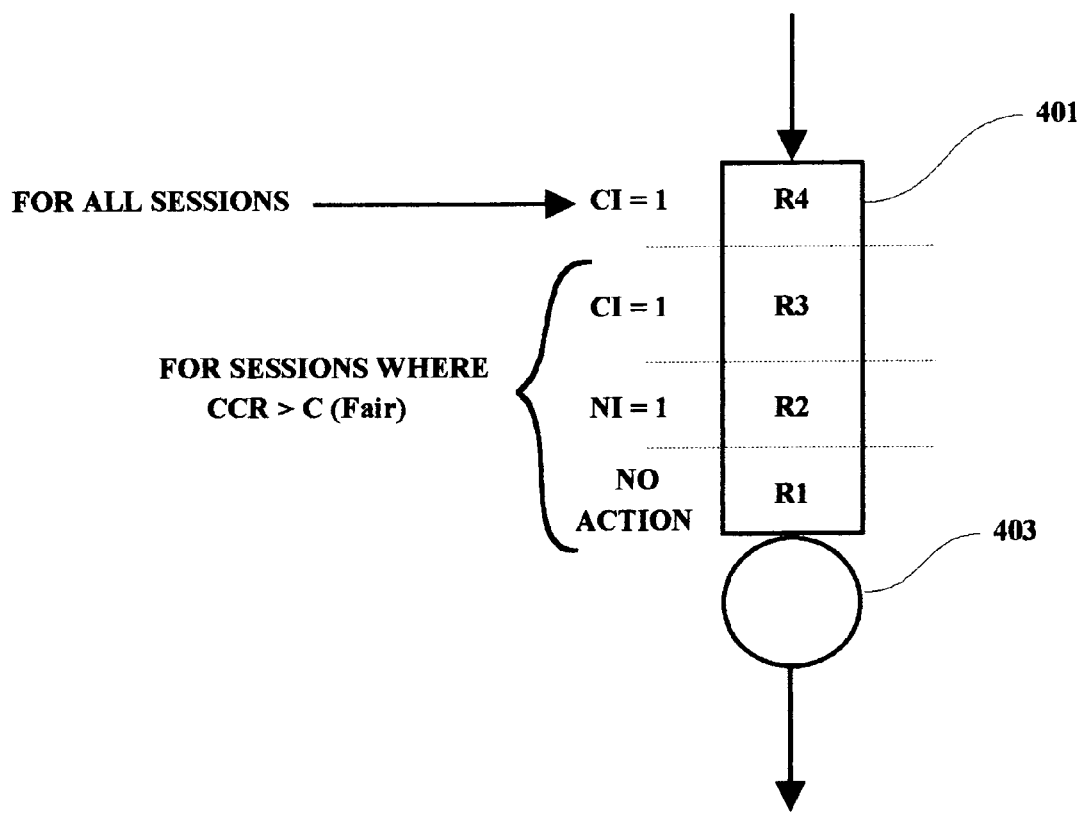
FIG. 4 is an illustration showing the enhanced marking scheme implemented in an exemplary embodiment of the present invention.

FIG. 4 shows the enhanced marking scheme. In the FIG. 4 example, there are three thresholds. When the buffer 401 occupancy rate is in region R1, the switch 403 is assumed to be underloaded and all sessions are allowed to increase their sending rate. When the occupancy is in region R2, the switch 403 is assumed to be operating at desired load. In that case, the NI bit is set in the RM cells for all sessions for which CCR>C(Fair). When the buffer 401 occupancy falls in the region R3, the switch 403 is assumed to be congested and the CI bit is set for all sessions for which CCR>C(Fair). If the buffer 401 occupancy rate is in region R4, the NI and CI bits are set for all sessions irrespective of their CCR. This will ensure that losses are prevented and the network is protected if there are high rate sessions, with large propagation delays, and in the event that the computed fair share C(Fair) is inaccurate. An exemplary pseudocode listing for the methodology is as follows:

```
if (buffer occupancy is in region R4) {
  RM.CI = 1; /* set the CI bit in the RM cell */
} else if (RM.CCR > C_Fair) { /*this is a bottleneck link */
    if (buffer occupancy is in region R2) {
  RM.NI = 1; /* set the NI bit in the RM cell */
    }
    if (buffer occupancy is in region R3) {
  RM.CI = 1; /* set the CI bit in the RM cell */
    }
}
```

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The methodology may also be implemented partially or solely in program code and carried on a medium which may be executed to function as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for adjusting session cell rates for transfer sessions at which information cells are transferred from node buffers of a node output link in a network, wherein said session cell rates are adjusted in accordance with buffer occupancy levels of said node buffers and first and second traffic congestion indicator fields, said method comprising:

establishing a critical buffer occupancy level indicative of a high level of buffer occupancy;

determining a current buffer occupancy level;

setting said first and second traffic congestion indicator fields for all sessions to a first setting indicative of maximum congestion when said current buffer occupancy level exceeds said critical buffer occupancy level;

determining a fair share cell rate for the output transmission link, said fair share cell rate being related to a number of sessions being transferred by said output transmission link;

determining a current cell rate at which information cells are being transferred; and setting said first and second congestion indicator fields in accordance with a buffer occupancy threshold schedule if said current buffer occupancy level is less than said critical buffer occupancy level.

2. The method as set forth in claim 1 wherein said occupancy threshold schedule comprises a series of buffer occupancy threshold values with corresponding settings for said first and second traffic congestion indicator fields.

3. The method as set forth in claim 2 wherein said series of buffer occupancy threshold values define first, second and third ranges of buffer occupancy, said first, second and third ranges being below said critical buffer occupancy level.

4. The method as set forth in claim 3 wherein if said current buffer occupancy level falls within said first range, all of said transfer sessions are enabled to increase session cell rates.

5. The method as set forth in claim 4 wherein if said current buffer occupancy level falls within said second range, transfer sessions having current cell rates greater than said fair share cell rate are precluded from increasing session cell rates.

6. The method as set forth in claim 5 wherein if said current buffer occupancy level falls within said third range, all transfer sessions are precluded from increasing session cell rates.

7. A network configuration comprising:

a plurality of nodes connected together in a network arrangement, each of said nodes being coupled to an output transmission link for transmitting a plurality of transfer sessions from node buffers at said nodes;

means connected at said nodes for adjusting session cell rates at which information cells are transferred from node buffers of said output transmission links, whereby said session cell rates are adjusted in accordance with buffer occupancy levels of said node buffers and first and second traffic congestion indicator fields;

means for establishing a critical buffer occupancy level indicative of a high level of buffer occupancy;

means for determining a current buffer occupancy level;

means for setting said first and second traffic congestion indicator fields for all sessions to a first setting indicative of maximum congestion when said buffer occupancy level exceeds said critical buffer occupancy level;

means arranged at said nodes for determining a fair share cell rate for the output transmission links, said fair share cell rate being related to a number of sessions being transferred by said output transmission link;

means for determining a current cell rate at which information cells are being transferred; and setting said first and second congestion indicator fields in accordance with a buffer occupancy threshold schedule if said current buffer occupancy level is less than said first buffer occupancy level.

8. The network configuration as set forth in claim 7 wherein said occupancy threshold schedule comprises a series of buffer occupancy threshold values with corresponding settings for said first and second traffic congestion indicator fields.

9. The network configuration as set forth in claim 8 wherein said series of buffer occupancy threshold values define first, second and third ranges of buffer occupancy, said first, second and third ranges being below said critical buffer occupancy level.

10. The network configuration as set forth in claim 9 wherein if said current buffer occupancy level falls within said first range, all of said transfer sessions are enabled to increase session cell rates.

11. The network configuration as set forth in claim 10 wherein if said current buffer occupancy level falls within said second range, transfer sessions having current cell rates greater than said fair share cell rate are precluded from increasing session cell rates.

12. The network configuration as set forth in claim 11 wherein if said current buffer occupancy level falls within said third range, all transfer sessions are precluded from increasing session cell rates.

* * * * *